Patented July 24, 1923.

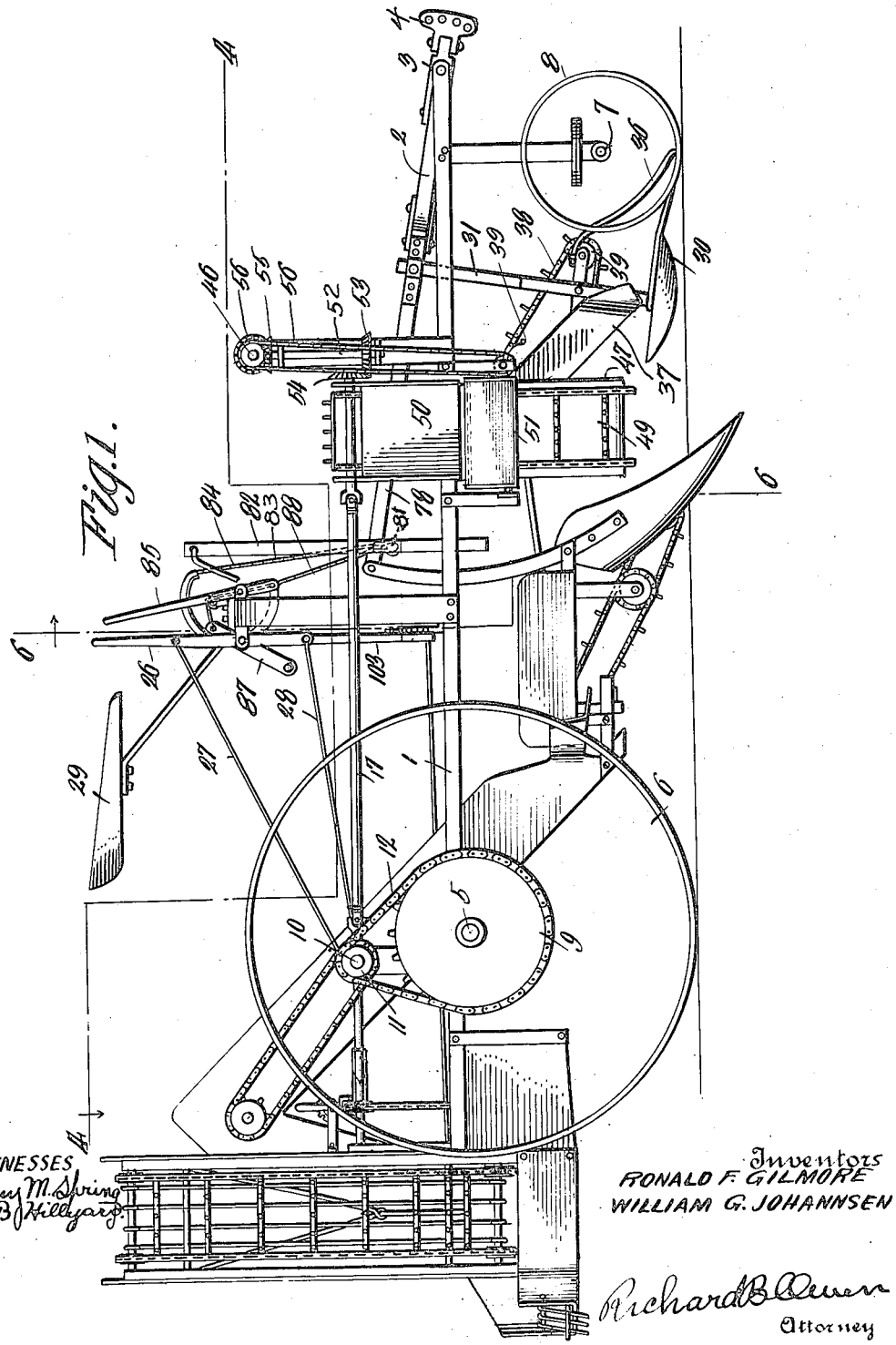

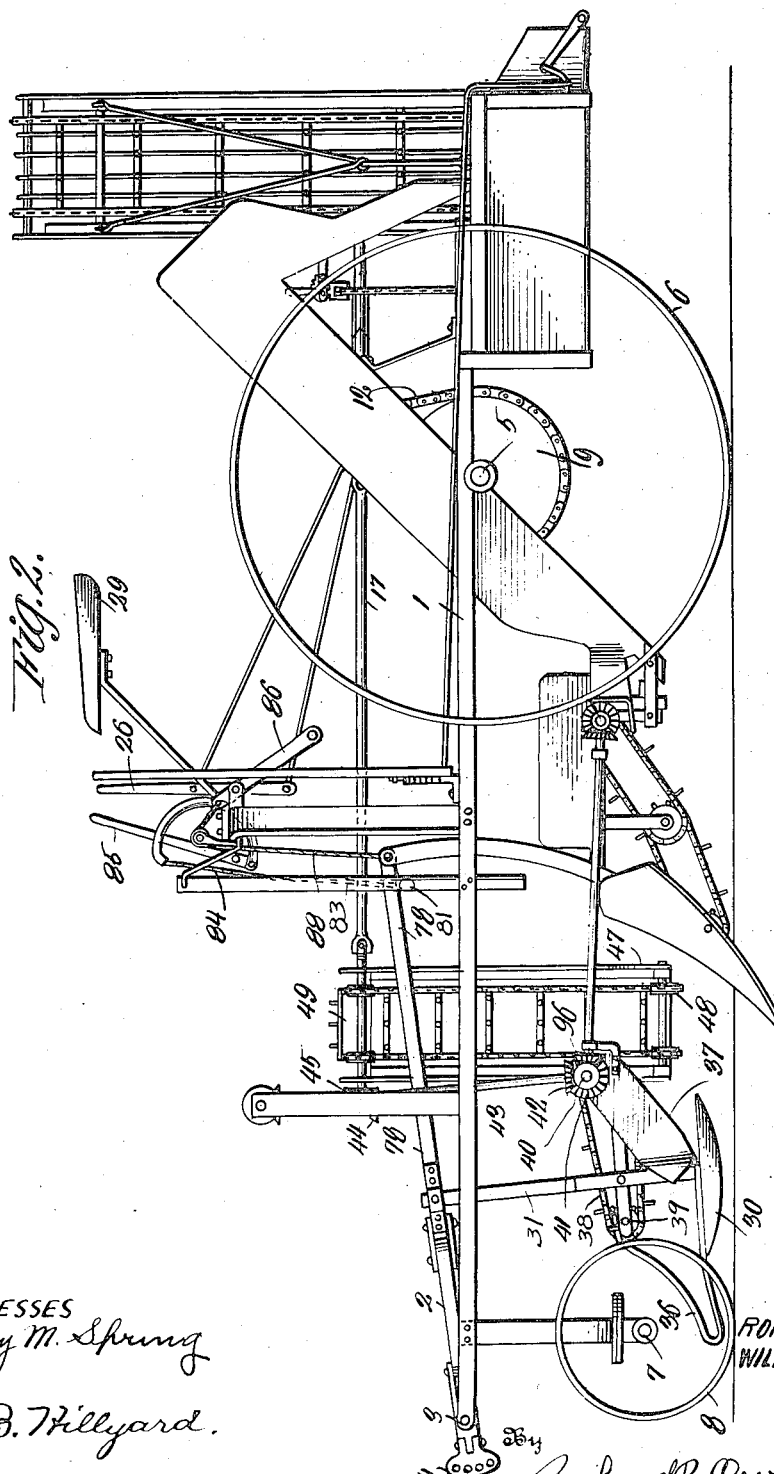

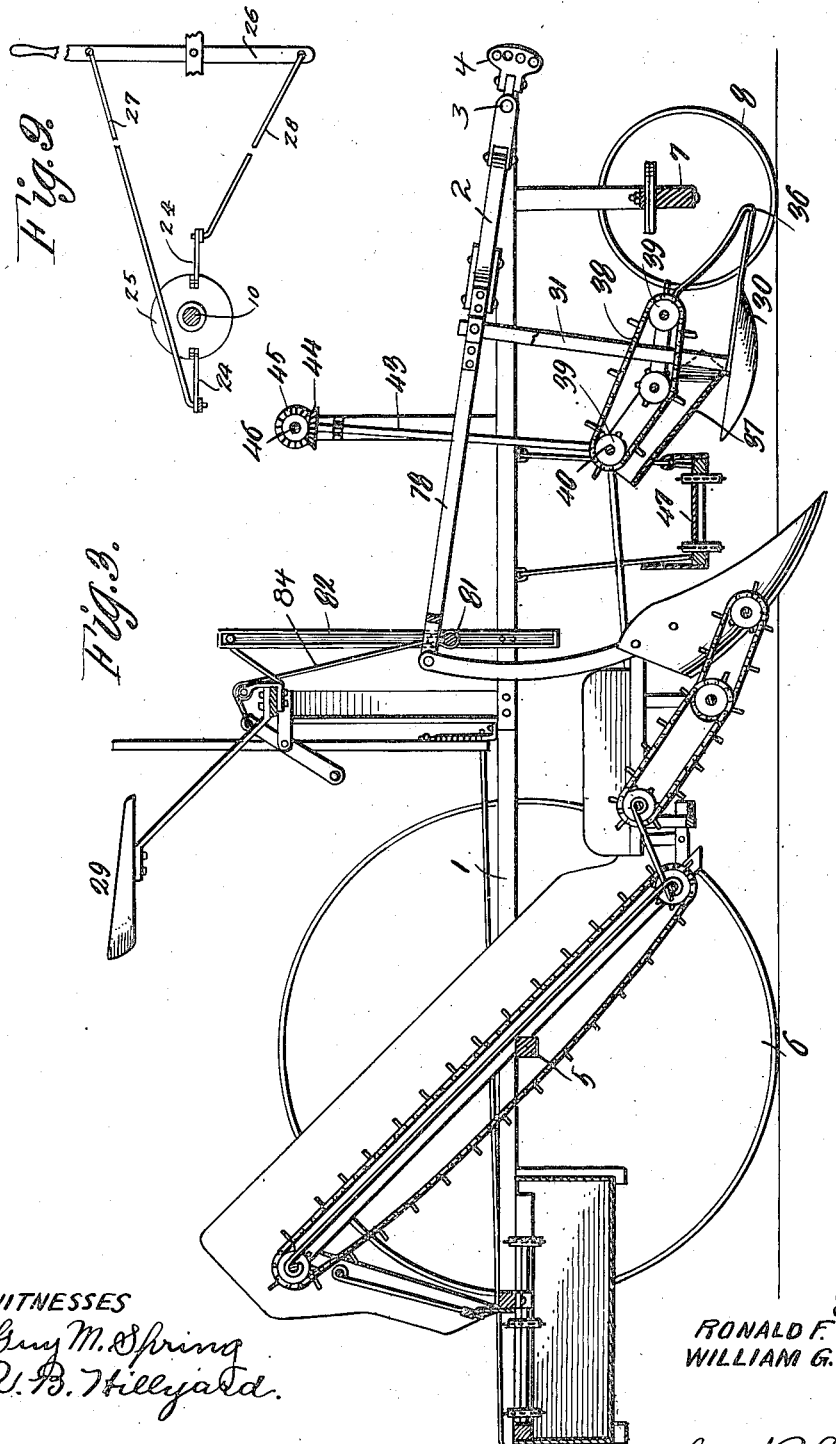

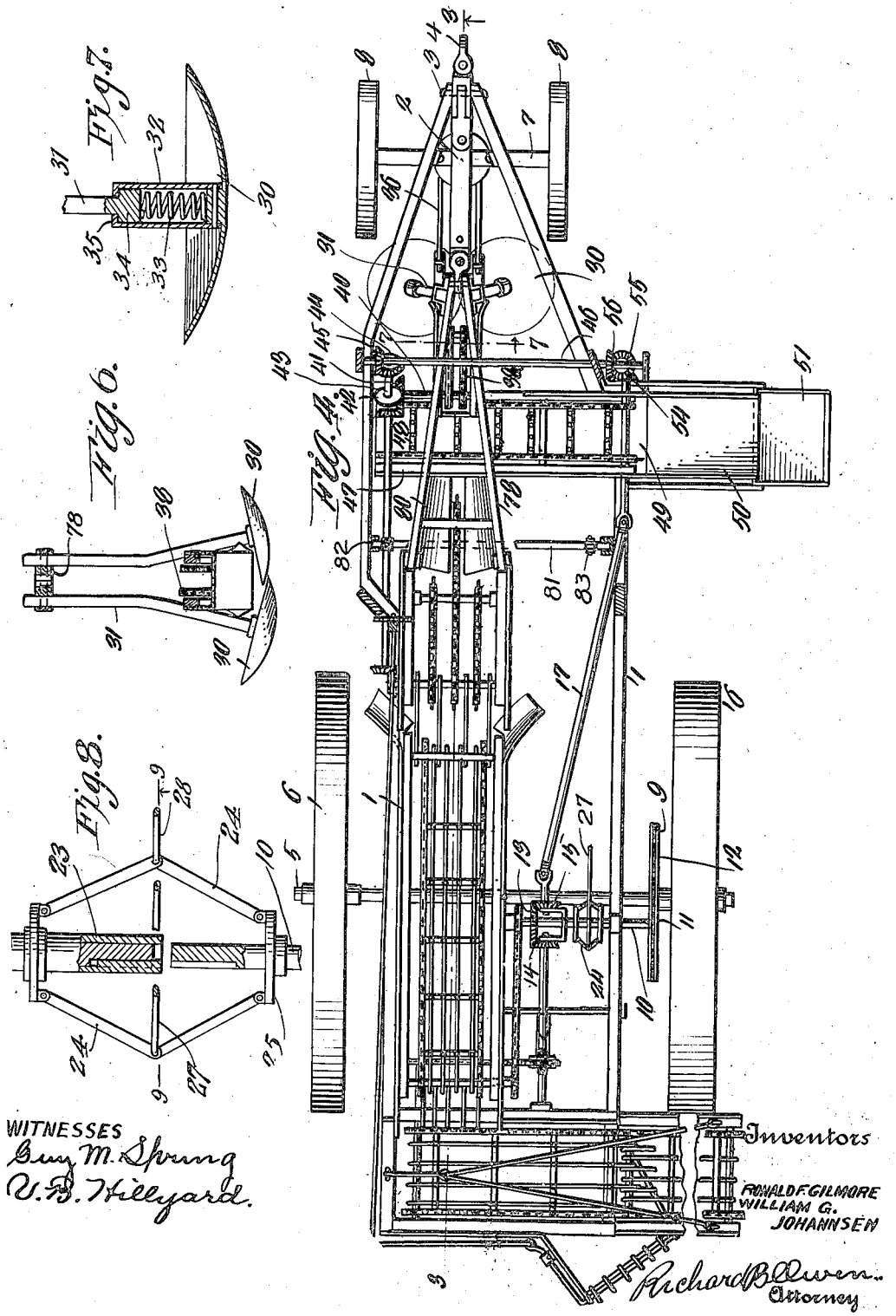

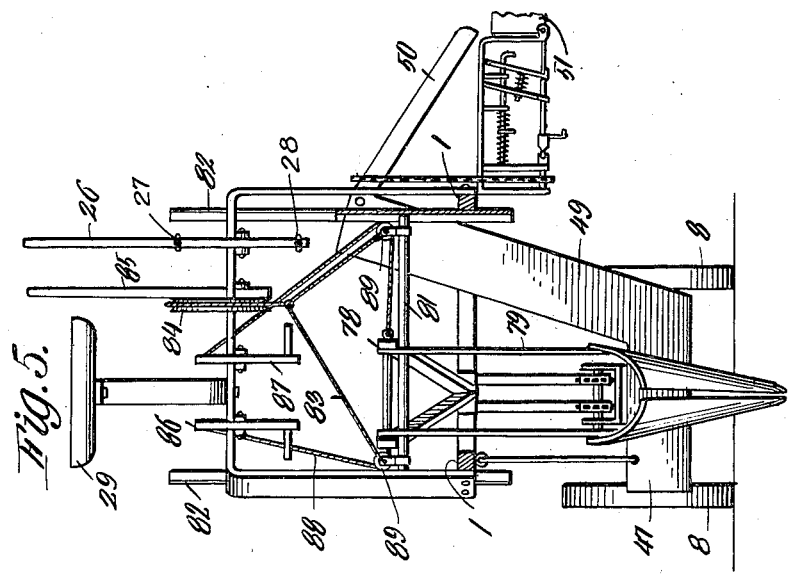

1,463,078

UNITED STATES PATENT OFFICE.

RONALD F. GILMORE AND WILLIAM G. JOHANNSEN, OF ALGONA, IOWA.

BEET HARVESTER.

Application filed July 17, 1919. Serial No. 311,421.

*To all whom it may concern:*

Be it known that we, RONALD F. GILMORE and WILLIAM G. JOHANNSEN, citizens of the United States, residing at Algona, in the county of Kossuth and State of Iowa, have invented certain new and useful Improvements in Beet Harvesters, of which the following is a specification.

The invention relates to field implements for agricultural purposes, being designed chiefly to provide a machine for harvesting beets and like eatable roots.

The invention aims to provide a machine of the character and for the purpose stated which in operation removes the tops of the beets from the roots and delivers them at one side of the machine, either in heaps or into a suitable receiver.

The invention furthermore aims to provide a machine which is automatic in its several operations and which is at all times under control of the operator, whereby the parts may be adjusted to meet conditions or thrown into and out of gear, as required.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

The drawings hereto attached, illustrate a practical embodiment of the invention and on reference thereto:—

Fig. 1 is a side view of the machine.

Fig. 2 is an elevation of the machine as seen from the reverse side of Fig. 1.

Fig. 3 is a vertical longitudinal section on the line 3—3 of Fig. 4.

Fig. 4 is a top plan view, the intermediate portion being in section as designated by the line 4—4 of Fig. 1.

Fig. 5 is a transverse section on the line 6—6 of Fig. 1 looking towards the front, as indicated by the arrows, the outer portion of the receptacle for the tops of the beets being broken away.

Fig. 6 is a sectional detail on the line 7—7 of Fig. 4 looking in the direction of the arrow.

Fig. 7 is a sectional detail of one of the cutters for severing the tops from the roots.

Fig. 8 is a sectional detail of the clutch mechanism, whereby the operating parts are thrown into and out of gear.

Fig. 9 is a sectional detail on the line 9—9 of Fig. 8, the operating lever being illustrated.

Corresponding and like parts are referred to in the following description and indicated in the several views of the drawings by like reference characters.

The frame work may be of any suitable construction best adapted for supporting the working parts and includes longitudinal bars 1 which are connected at suitable points by transverse bars. The longitudinal bars 1 converge at their forward ends, as shown most clearly in Fig. 4 and receive between their converging ends a beam 2 which is pivotally connected thereto by means of a suitable fastening 3. The beam 2 is provided at its front end with a suitable clevis 4 for attachment thereto of the draft means, whereby the machine is drawn over the field and which may consist of a team of horses or a tractor. An axle 5 is applied to the rear portion of the frame work and is provided with wheels 6. An axle 7 supports the front portion of the machine and is connected to the frame work by means of a king bolt and fifth wheel, so that the axle may be turned to admit of the machine being properly steered. The axle 7 is provided with supporting wheels 8. One of the rear wheels 6 constitutes the driver and has a sprocket gear 9 secured thereto. A counter shaft 10 is mounted on the frame work parallel with the axle 5 and is provided at one end with a sprocket gear 11 which is connected by means of a sprocket chain 12 with the sprocket gear 9. A bevel gear 13 secured to the counter shaft 10 so as to rotate therewith is in mesh with companion bevel gears 14, and 15 secured to shaft 17. The shaft 17 is disposed forwardly and comprises sections which are connected by universal joints, as shown most clearly in Fig. 4.

The shaft 10 is of sectional formation, as indicated most clearly in Fig. 8, the opposing ends of the sections being centered to hold them in alignment, the extremity of one section being pointed, whereas the extremity of the companion section is recessed to receive the pointed end of the cooperating section. A clutch member 23 cooperates with the sections of the shaft 10 to couple the same when it is required to have both sections rotate in unison. As indicated in Fig. 4 one section of the shaft 10 has the sprocket gear 11 secured thereto and the other shaft has the bevel gear 13 fastened thereto. The clutch member 23 is slidably mounted upon one of the sections and when slid across the joint to engage the companion section both parts or sections of the shaft 10 rotate. For operating the clutch member 23 toggle levers 24 are employed, said toggle levers being connected at one end to the clutch member 23 and at its opposite end to a collar 25 loose upon the companion section of the shaft. As shown most clearly in Fig. 9, an operating lever 26 mounted on an upright of the frame work is connected with the respective toggle levers by means of rods 27 and 28. One of the connecting rods operates by a pulling action whereas the other connecting rod operates by a pushing action. The operating lever 26 extends within convenient reach of the driver's seat 29.

The topping mechanism is located at the front end of the machine and comprises two disk cutters, 30. Each disk cutter 30 is mounted upon the lower end of a standard 31 which is connected at its upper end to the beam 78. The standards 31 have their lower portions inclined outwardly, as shown most clearly in Fig. 6 to clear the conveyor by means of which the tops of the beets are carried upwardly and rearwardly to a transverse conveyor. The inner portions of the disk cutters overlap, thereby insuring complete severance of the tops from the roots. The lower faces of the disk cutters are convex, whereby they may contact with the roots without injuring the same. In order that the cutter mechanism may adapt itself to the beets, so as to cut the same close to the beets, the cutters 30 are mounted so as to yield, this being indicated most clearly in Fig. 7. Each disk cutter is provided with a tubular stem 32 which is slidable on the lower end of the supporting standard 31. An expansible helical spring 33 is housed in the stem 32 and exerts a downward pressure on the disk. The lower end of the standard 31 is enlarged, as indicated at 34 and the upper end of the stem 32 is inwardly flanged, as indicated at 35 to engage the head or enlargement 34 and prevent displacement of the cutter while admitting of its yielding upward to adapt itself to the beet so that the top may be removed therefrom close to the body of the root.

Lifting elements 36 are disposed to operate in advance of the topping mechanism to properly position the tops and direct them to the cutting mechanism and the conveyor cooperating therewith. The lifting elements 36 are connected to the standards 31 and extend forwardly and have their upper portions inclined upwardly and rearwardly so as to insure a lifting of the tops of the roots into proper and convenient position for delivery to the conveyor when severed from the beets. The lifting elements 36 are preferably constructed of stout wire which is bent into approximately V form.

A combined conveyor and elevator is located above and in the rear of the topping mechanism and includes a trough 37 and an endless chain 38, the latter being supported by means of a plurality of sprocket wheels 39 which are mounted upon a suitable support. One of the sprocket wheels 39 is positively driven in a direction to cause the lower portion of the conveyor chain 38 to travel rearwardly, whereby the tops are moved through the trough 37 and discharged from the upper rear end thereof. A shaft 40 has a set of sprocket wheels 39 connected thereto and is adapted to be positively driven so as to operate the conveyor chain 38. A bevel gear 41 is secured to one end of the shaft 40 and is in mesh with a bevel gear 42 secured to the lower end of an upright shaft 43 which is provided at its upper end with a bevel gear 44 which in turn meshes with a bevel gear 45 secured to a transverse shaft 46 geared in turn to the tumbling shaft 17, as indicated most clearly in Fig. 4.

A tranverse conveyor is located in the rear of the longitudinal conveyor and elevator and comprises a trough 47 and an endless conveyor 48 cooperating therewith and driven so that its upper portion moves the tops of the beets to one side of the machine to an elevator 49, whereby the said tops are delivered to a chute 50 by means of which they are discharged into a receptacle 51 at one side of the machine. The elevator 49 is similar in construction to the horizontal conveyor and comprises a suitable conduit through which an endless conveyor is adapted to operate. The endless conveyor comprising the elevator 49 derives movement from the tumbling shaft 17 through suitable gearing, as indicated most clearly in Figs. 1 and 4. A vertical shaft 52 at one side of the machine is provided at its lower end with a bevel gear 53 which is in mesh with a bevel gear 54 at the forward end of the tumbling shaft 17. A bevel gear 55 at the upper end of the shaft 52 meshes with a bevel gear 56 secured to the transverse shaft 46. In this manner the shaft 52 is driven directly from the tumbling shaft 17 and in turn drives the shaft 43.

Beams 78 have pivotal connection at their forward ends with the beam 2. The rear ends of the beams 78 are adapted to be moved vertically and laterally. This twofold adjustment is effected by means now to be described. A transverse bar 81 is mounted at its ends in vertical guides 82. A flexible element 83, such as a cord or wire is secured at its ends to opposite ends of the bar 81 and is loose intermediate of its ends and engages the lower end of an element 84 which cooperates with a lever 85 conveniently positioned to the driver's seat 29.

Operation of the lever 85 provides for raising and lowering of the bar 81. The rear ends of the beams 78 resting on the bar 81 move with the bar 81 when the latter is adjusted vertically. Two treadle members 86 and 87 have opposite ends of a cord or like flexible element 88 connected thereto, respectively. The cord 88 passes around guide pulleys 89 at opposite ends of the bar 81. The cord 88 is connected to the rear ends of the beams 78. By proper manipulation of the treadle members 86 and 87, the rear ends of the beams 78 may be moved laterally on the rod 81.

From the foregoing taken in connection with the accompanying drawings it will be understood that the machine when adjusted is automatic in operation in severing the tops from the roots and discharging the same into a suitable receiver or in piles to be subsequently gathered. The topping mechanism is at all times under control of the operator and may be adjusted vertically and laterally so as to insure cutting the crop and this is of importance when it is remembered that many of the beets or roots are out of line and it is essential to make provision for adjusting the cutters because it is not possible to quickly steer the machine as a whole in order to depart from a straight line in order to top the beets that happen to be out of line.

Having thus fully described our invention, what we claim as new and desire to secure by Letters Patent is:—

1. In a harvester of the character set forth, a standard having an enlargement at its lower end, a cutter, a tubular stem projecting from the cutter and slidably mounted on the standard and having its upper portion drawn inward to engage the enlargement of the standard to limit the movement of the cutter in one direction and an expansible helical spring mounted within the tubular stem of the cutter and normally pressing the latter downwardly.

2. In a harvester of the character specified, a topping mechanism, a supporting beam therefor, and means adjustable vertically against one end of the beam for adjusting the topping mechanism vertically.

3. In a harvester of the character specified, the combination with a topping mechanism, of a supporting beam laterally adjustable at one end, and means movable vertically against the adjustable end of the beam for adjusting the topping mechanism vertically.

4. In a harvester of the character specified, a beam, a topping mechanism carried thereby, a guide on opposite sides of the beam, and means under the control of the operator for adjusting the beam vertically and laterally between the guides.

5. In a harvester of the character specified, a topping mechanism, a digger mechanism, a means joining the two mechanisms, and means for moving the beam to simultaneously adjust the mechanism vertically and laterally.

In testimony whereof we affix our signatures in presence of two witnesses.

RONALD F. GILMORE.
WILLIAM G. JOHANNSEN.

Witnesses:
E. J. GILMORE,
C. B. HUTCHINS.